US011869212B1

(12) United States Patent
Jeong

(10) Patent No.: US 11,869,212 B1
(45) Date of Patent: Jan. 9, 2024

(54) METHOD FOR TRAINING VIDEO OBJECT DETECTION MODEL USING TRAINING DATASET AND LEARNING DEVICE USING THE SAME

(71) Applicant: Deeping Source Inc., Seoul (KR)

(72) Inventor: Jong Hu Jeong, Seoul (KR)

(73) Assignee: Deeping Source Inc., Seoul (KR)

( * ) Notice: Subject to any disclaimer, the term of this patent is extended or adjusted under 35 U.S.C. 154(b) by 0 days.

(21) Appl. No.: 18/106,518

(22) Filed: Feb. 7, 2023

(51) Int. Cl.
   *G06T 7/70* (2017.01)
   *G06V 10/25* (2022.01)
   *G06V 10/771* (2022.01)

(52) U.S. Cl.
   CPC ............... *G06T 7/70* (2017.01); *G06V 10/25* (2022.01); *G06V 10/771* (2022.01); *G06T 2207/20081* (2013.01); *G06V 2201/07* (2022.01)

(58) Field of Classification Search
   CPC . G06T 7/70; G06T 2207/20081; G06V 10/25; G06V 10/771; G06V 2201/07
   See application file for complete search history.

(56) References Cited

U.S. PATENT DOCUMENTS

| | | | |
|---|---|---|---|
| 10,902,290 B1* | 1/2021 | Kim | G06N 3/048 |
| 10,970,598 B1* | 4/2021 | Ryu | G06V 10/25 |
| 11,023,780 B1* | 6/2021 | Kim | G06F 18/213 |
| 2019/0057507 A1* | 2/2019 | El-Khamy | G06T 11/60 |
| 2020/0349392 A1* | 11/2020 | Yehezkel Rohekar | G06F 18/214 |
| 2022/0383031 A1* | 12/2022 | Chen | G06F 16/5838 |
| 2023/0047628 A1* | 2/2023 | Zhou | G06V 10/62 |

* cited by examiner

*Primary Examiner* — Santiago Garcia
(74) *Attorney, Agent, or Firm* — Ulmer & Berne LLP

(57) ABSTRACT

A method of training a video object detection model by using a training dataset is provided, including steps of: a learning device (a) after acquiring a training image (i) inputting the training image and first prior information, set as having probabilities of objects existing in locations in the training image, into the video object detection model, to thereby detect the objects and thus output first object detection information, and (ii) generating second prior information, which includes location information of the objects on the training image; (b) inputting the training image and the second prior information into the video object detection model, to detect the objects on the training and thus output second object detection information; and (c) generating a loss by referring to the second object detection information and a ground truth corresponding to the training image, and train the video object detection model to minimize the loss.

20 Claims, 7 Drawing Sheets

METHOD FOR TRAINING VIDEO OBJECT DETECTION MODEL USING TRAINING DATASET AND LEARNING DEVICE USING THE SAME

FIELD OF THE DISCLOSURE

The present disclosure relates to a method of training a video object detection model for detecting objects from a video and a learning device using the same; and more particularly, the method of generating a training data set by using the video object detection model itself as a pseudo labeler and thus train the video object detection model and the learning device using the same.

BACKGROUND OF THE DISCLOSURE

Object detection technology is closely related to computer vision and image processing and analyzes locations and types of objects in an image or a video, to thereby detect the objects.

Such object detection technology has made significant progress by relying on rapid development of deep convolutional neural networks. A performance of the object detection technology in a single image is very good, and thus the object detection technology is used in various fields such as autonomous driving, security systems, military purposes, and sports.

However, the object detection technology has problems such as motion blur, video defocus, part occlusion, rare poses, etc., because of the nature of a video in which an object cannot be accurately detected due to a deteriorated appearance of the object.

Accordingly, a video object detection technology has emerged as a new area of computer vision that solves the problems of the object detection technology occurring in the video.

The video object detection technology utilizes temporal information to solve problems related to degraded appearances of the object and to improve robustness of the video object detection.

That is, in the video object detection technology, the object detection of a current frame image is performed by using information on objects detected in at least one previous frame image, thereby solving the problems related to the degraded appearances of the object.

In order to train a video object detection model, which is a model for performing such video object detection, a training dataset having several frame images, that is, a training dataset having temporal information, is required.

It is appreciated that a large amount of diverse data is essential to train the video object detection model.

Since a typical video dataset is 1800 frame images in case of a 1-minute video of 30 frame images per second (fps), it is easy to collect many frame images, but it is difficult to collect various backgrounds. That is, since the backgrounds that can be obtained from a single video are limited, many videos are required to create the training dataset that includes various backgrounds, and accordingly, there is a problem that costs involved in generating the training dataset for training the video object detection model are significant.

SUMMARY OF THE DISCLOSURE

It is an object of the present disclosure to solve all the aforementioned problems.

It is another object of the present disclosure to train a video object detection model using a training dataset that is relatively easy to collect various backgrounds.

It is still another object of the present disclosure to train the video object detection model using the training dataset, in which a lot of data having various backgrounds are collected at a low cost.

It is still yet another object of the present disclosure to train the video object detection model using training data from the training dataset which includes both image data and video data.

It is still yet another object of the present disclosure to generate pseudo temporal information from the training data by using the video object detection model itself as a pseudo labeler and thus train the video object detection.

In order to accomplish objects above, representative structures of the present disclosure are described as follows:

In accordance with one aspect of the present disclosure there is provided a method of training a video object detection model by using a training dataset, including steps of: (a) in response to acquiring a training image from the training dataset, a learning device (i) inputting the training image and first prior information, set as having each of probabilities of each of objects existing in each of locations in the training image, into the video object detection model, to thereby instruct the video object detection model to detect the objects from the training image by referring to the first prior information and thus output first object detection information, and (ii) generating second prior information, which includes location information of the objects on the training image, by using the first object detection information; (b) the learning device inputting the training image and the second prior information into the video object detection model, to thereby instruct the video object detection model to detect the objects on the training image by referring to the second prior information and thus output second object detection information; and (c) the learning device generating at least one loss by referring to the second object detection information and a ground truth corresponding to the training image, to thereby train the video object detection model to minimize the loss.

As one example, at the step of (a), the learning device generates, as the second prior information, (i) a first mask having a same size as the training image or (ii) at least one second mask having a same size as at least one feature map obtained through a forward-propagation of the training image in the video object detection model, by using multiple pieces of location information of each of bounding boxes corresponding to each of the objects included in the first object detection information, wherein the first mask and the second mask are obtained by distinguishing each of regions corresponding to each of the bounding boxes from regions corresponding to non-bounding boxes.

As one example, at the step of (b), the learning device performs at least one of processes of (i) inputting the first mask into the video object detection model, to thereby instruct the video object detection model to (i-1) apply the first mask to the training image by an addition, a multiplication, or a concatenation thereof, thus generating a modified training image, and (i-2) perform the forward-propagation of the modified training image, thus detecting the objects from the modified training image, and (ii) inputting the second mask into the video object detection model, to thereby instruct the video object detection model to (ii-1) apply the second mask to the feature map by an addition, a multiplication, or a concatenation thereof, thus generating at least one modified feature map, and (ii-2) perform a part of the forward-propagation of the modified feature map, thus detecting the objects from the modified feature map.

As one example, at the step of (a), the learning device generates, as the second prior information, a bounding box vector by vectorizing multiple pieces of location information of each of bounding boxes corresponding to each of the objects included in the first object detection information.

As one example, at the step of (b), the learning device performs at least one of processes of (i) inputting the bounding box vector into the video object detection model, to thereby instruct the video object detection model to (i-1) apply predetermined pixel values, corresponding to the bounding box vector, to the training image by an addition, a multiplication, or a concatenation thereof, thus generating a modified training image, and (i-2) perform a part of a forward-propagation of the modified training image, and (ii) inputting the bounding box vector into the video object detection model, to thereby instruct the video object detection model to (ii-1) apply predetermined feature values, corresponding to the bounding box vector, to at least one feature map by an addition, a multiplication, or a concatenation thereof, thus generating at least one modified feature map, and (ii-2) perform the part of the forward-propagation of the modified feature map, wherein the predetermined pixel values and the predetermined feature values correspond to multiple pieces of the location information of the bounding boxes corresponding to the bounding box vector, and wherein the feature map is obtained through the forward-propagation of the training image.

As one example, the first prior information is additionally set as having each of the probabilities of each of the objects not existing in one or more specific areas of the training image.

In accordance to another aspect of the present disclosure there is provided a method of training a video object detection model using a training dataset, including steps of: (a) in response to acquiring a training video from the training dataset, a learning device performs one of processes of (i) (i-1) inputting (i-1-1) a (t−i)-th frame image, which is any one of frame images prior to a t-th frame image, or a (t+j)-th frame image, which is any one of frame images following the t-th frame image, wherein the t-th frame image is any one of a plurality of frame images constituting the training video, and wherein i and j are integers greater than 0, and (i-1-2) first prior information, set as having each of probabilities of each of objects existing in each of locations in the (t−i)-th frame image or the (t+j)-th frame image, into the video object detection model, to thereby instruct the video object detection model to detect the objects from the (t−i)-th frame image or the (t+j)-th frame image by referring to the first prior information and thus output first object detection information, and (i-2) generating second prior information, which includes multiple pieces of location information of the objects on the (t−i)-th frame image or the (t+j)-th frame image, by using the first object detection information, and (ii) generating the second prior information, which includes multiple pieces of the location information of the objects on the (t−i)-th frame image or the (t+j)-th frame image, by using a (t−i)-th ground truth corresponding to the (t-i)-th frame image or a (t+j)-th ground truth corresponding to the (t+j)-th frame image; (b) the learning device inputting the t-th frame image and the second prior information into the video object detection model, to thereby instruct the video object detection model to detect the objects on the t-th frame image by referring to the second prior information and thus output second object detection information; and (c) the learning device generating at least one loss by referring to the second object detection information and a t-th ground truth corresponding to the t-th frame image, to thereby train the video object detection model to minimize the loss.

As one example, at the step of (a), the learning device generates, as the second prior information, (i) (i-1) a first mask having a same size as the (t−i)-th frame image or the (t+j)-th frame image or (i-2) at least one second mask having a same size as at least one first feature map obtained through a forward-propagation of the (t−i)-th frame image or the (t+j)-th frame image in the video object detection model, by using multiple pieces of location information of bounding boxes corresponding to each of the objects included in the first object detection information, or (ii) (ii-1) the first mask having a same size as the t-th frame image or (ii-2) the second mask having a same size as at least one second feature map obtained through the forward-propagation of the t-th frame image in the video object detection model, by using multiple pieces of the location information of the bounding boxes corresponding to each of the objects included in the (t−i)-th ground truth or the (t+j)-th ground truth, wherein the first mask and the second mask are obtained by distinguishing each of regions corresponding to each of the bounding boxes from regions corresponding to non-bounding boxes.

As one example, at the step of (b), the learning device performs at least one of processes of (i) inputting the first mask into the video object detection model, to thereby instruct the video object detection model to (i-1) apply the first mask to the t-th frame image by an addition, a multiplication, or a concatenation thereof, thus generating a modified frame image, and (i-2) perform the forward-propagation of the modified frame image, thus detecting the objects from the modified frame image, and (ii) inputting the second mask into the video object detection model, to thereby instruct the video object detection model to (ii-1) apply the second mask to the second feature map by an addition, a multiplication, or a concatenation thereof, thus generating at least one modified feature map, and (ii-2) perform a part of the forward-propagation of the modified feature map, thus detecting the objects from the modified feature map.

As one example, at the step of (a), the learning device generates, as the second prior information, a bounding box vector by vectorizing (1) multiple pieces of location information of bounding boxes corresponding to each of the objects included in the first object detection information, or (2) the location information of the bounding boxes corresponding to each of the objects included in the (t−i)-th ground truth or the (t+j)-th ground truth.

As one example, at the step of (b), the learning device performs at least one of processes of (i) inputting the bounding box vector into the video object detection model, to thereby instruct the video object detection model to (i-1) apply predetermined pixel values, corresponding to the bounding box vector, to the t-th frame image by an addition, a multiplication, or a concatenation thereof, thus generating a modified frame image, and (i-2) perform part of a forward-propagation of the modified frame image, and (ii) inputting the bounding box vector into the video object detection model, to thereby instruct the video object detection model to (ii-1) apply predetermined feature values, corresponding to the bounding box vector, to at least one second feature map by an addition, a multiplication, or a concatenation thereof, thus generating at least one modified feature map, and (ii-2) perform the part of the forward-propagation of the modified feature map, wherein the predetermined pixel values and the predetermined feature values correspond to multiple pieces of the location information of the bounding boxes corresponding to the bounding box vector, and wherein the second feature map is obtained through the forward-propagation of the t-th frame image.

As one example, the first prior information is additionally set as having each of the probabilities of each of the objects not existing in one or more specific areas of the (t–i)-th frame image, and the (t+j)-th frame image.

In accordance to still another aspect of the present disclosure there is provided A learning device for training a video object detection model by using a training dataset, including: at least one memory that stores instructions; and at least one processor configured to execute the instructions to perform processes of: (I) in response to acquiring a training image from the training dataset, (i) inputting the training image and first prior information, set as having each of probabilities of each of objects existing in each of locations in the training image, into the video object detection model, to thereby instruct the video object detection model to detect the objects from the training image by referring to the first prior information and thus output first object detection information, and (ii) generating second prior information, which includes location information of the objects on the training image, by using the first object detection information; (II) inputting the training image and the second prior information into the video object detection model, to thereby instruct the video object detection model to detect the objects on the training image by referring to the second prior information and thus output second object detection information; and, (III) generating at least one loss by referring to the second object detection information and a ground truth corresponding to the training image, to thereby train the video object detection model to minimize the loss.

As one example, at the process of (I), the processor generates, as the second prior information, (i) a first mask having a same size as the training image or (ii) at least one second mask having a same size as at least one feature map obtained through a forward-propagation of the training image in the video object detection model, by using multiple pieces of location information of each of bounding boxes corresponding to each of the objects included in the first object detection information, wherein the first mask and the second mask are obtained by distinguishing each of regions corresponding to each of the bounding boxes from regions corresponding to non-bounding boxes.

As one example, at the process of (II), the processor performs at least one of processes of (i) inputting the first mask into the video object detection model, to thereby instruct the video object detection model to (i-1) apply the first mask to the training image by an addition, a multiplication, or a concatenation thereof, thus generating a modified training image, and (i-2) perform the forward-propagation of the modified training image, thus detecting the objects from the modified training image, and (ii) inputting the second mask into the video object detection model, to thereby instruct the video object detection model to (ii-1) apply the second mask to the feature map by an addition, a multiplication, or a concatenation thereof, thus generating at least one modified feature map, and (ii-2) perform a part of the forward-propagation of the modified feature map, thus detecting the objects from the modified feature map.

As one example, at the process of (I), the processor generates, as the second prior information, a bounding box vector by vectorizing multiple pieces of location information of each of bounding boxes corresponding to each of the objects included in the first object detection information.

As one example, at the process of (II), the processor performs at least one of processes of (i) inputting the bounding box vector into the video object detection model, to thereby instruct the video object detection model to (i-1) apply predetermined pixel values, corresponding to the bounding box vector, to the training image by an addition, a multiplication, or a concatenation thereof, thus generating a modified training image, and (i-2) perform a part of a forward-propagation of the modified training image, and (ii) inputting the bounding box vector into the video object detection model, to thereby instruct the video object detection model to (ii-1) apply predetermined feature values, corresponding to the bounding box vector, to at least one feature map by an addition, a multiplication, or a concatenation thereof, thus generating at least one modified feature map, and (ii-2) perform the part of the forward-propagation of the modified feature map, wherein the predetermined pixel values and the predetermined feature values correspond to multiple pieces of the location information of the bounding boxes corresponding to the bounding box vector, and wherein the feature map is obtained through the forward-propagation of the training image.

As one example, the first prior information is additionally set as having each of the probabilities of each of the objects not existing in one or more specific areas of the training image.

In accordance to still yet another aspect of the present disclosure there is provided A learning device for training a video object detection model using a training dataset, including: at least one memory that stores instructions; and at least one processor configured to execute the instructions to perform processes of: (I) in response to acquiring a training video from the training dataset, (i) (i-1) inputting (i-1-1) a (t−i)-th frame image, which is any one of frame images prior to a t-th frame image, or a (t+j)-th frame image, which is any one of frame images following the t-th frame image, wherein the t-th frame image is any one of a plurality of frame images constituting the training video, and wherein i and j are integers greater than 0, and (i-1-2) first prior information, set as having each of probabilities of each of objects existing in each of locations in the (t−i)-th frame image or the (t+j)-th frame image, into the video object detection model, to thereby instruct the video object detection model to detect the objects from the (t−i)-th frame image or the (t+j)-th frame image by referring to the first prior information and thus output first object detection information, and (i-2) generating second prior information, which includes multiple pieces of location information of the objects on the (t−i)-th frame image or the (t+j)-th frame image, by using the first object detection information, and (ii) generating the second prior information, which includes multiple pieces of the location information of the objects on the (t−i)-th frame image or the (t+j)-th frame image, by using a (t−i)-th ground truth corresponding to the (t−i)-th frame image or a (t+j)-th ground truth corresponding to the (t+j)-th frame image; (II) inputting the t-th frame image and the second prior information into the video object detection model, to thereby instruct the video object detection model to detect the objects on the t-th frame image by referring to the second prior information and thus output second object detection information; and, (III) generating at least one loss by referring to the second object detection information and a t-th ground truth corresponding to the t-th frame image, to thereby train the video object detection model to minimize the loss.

As one example, at the process of (I), the processor generates, as the second prior information, (i) (i-1) a first mask having a same size as the (t−i)-th frame image or the (t+j)-th frame image or (i-2) at least one second mask having a same size as at least one first feature map obtained through a forward-propagation of the (t−i)-th frame image or the (t+j)-th frame image in the video object detection model, by using multiple pieces of location information of bounding boxes corresponding to each of the objects included in the first object detection information, or (ii) (ii-1) the first mask having a same size as the t-th frame image or (ii-2) the second mask having a same size as at least one second feature map obtained through the forward-propagation of the t-th frame image in the video object detection model, by using multiple pieces of the location information of the bounding boxes corresponding to each of the objects included in the (t−i)-th ground truth or the (t+j)-th ground truth, wherein the first mask and the second mask are obtained by distinguishing each of regions corresponding to each of the bounding boxes from regions corresponding to non-bounding boxes.

As one example, at the process of (II), the processor performs at least one of processes of (i) inputting the first mask into the video object detection model, to thereby instruct the video object detection model to (i-1) apply the first mask to the t-th frame image by an addition, a multiplication, or a concatenation thereof, thus generating a modified frame image, and (i-2) perform the forward-propagation of the modified frame image, thus detecting the objects from the modified frame image, and (ii) inputting the second mask into the video object detection model, to thereby instruct the video object detection model to (ii-1) apply the second mask to the second feature map by an addition, a multiplication, or a concatenation thereof, thus generating at least one modified feature map, and (ii-2) perform a part of the forward-propagation of the modified feature map, thus detecting the objects from the modified feature map.

As one example, at the process of (I), the processor generates, as the second prior information, a bounding box vector by vectorizing (1) multiple pieces of location information of bounding boxes corresponding to each of the objects included in the first object detection information, or (2) the location information of the bounding boxes corresponding to each of the objects included in the (t−i)-th ground truth or the (t+j)-th ground truth.

As one example, at the process of (II), the processor performs at least one of processes of (i) inputting the bounding box vector into the video object detection model, to thereby instruct the video object detection model to (i-1) apply predetermined pixel values, corresponding to the bounding box vector, to the t-th frame image by an addition, a multiplication, or a concatenation thereof, thus generating a modified frame image, and (i-2) perform part of a forward-propagation of the modified frame image, and (ii) inputting the bounding box vector into the video object detection model, to thereby instruct the video object detection model to (ii-1) apply predetermined feature values, corresponding to the bounding box vector, to at least one second feature map by an addition, a multiplication, or a concatenation thereof, thus generating at least one modified feature map, and (ii-2) perform the part of the forward-propagation of the modified feature map, wherein the predetermined pixel values and the predetermined feature values correspond to multiple pieces of the location information of the bounding boxes corresponding to the bounding box vector, and wherein the second feature map is obtained through the forward-propagation of the t-th frame image.

As one example, the first prior information is additionally set as having each of the probabilities of each of the objects not existing in one or more specific areas of the (t−i)-th frame image, and the (t+j)-th frame image.

In addition, recordable media that are readable by a computer for storing a computer program to execute the method of the present disclosure is further provided.

BRIEF DESCRIPTION OF THE DRAWINGS

The following drawings to be used for explaining example embodiments of the present disclosure are only part of example embodiments of the present disclosure and other drawings can be acquired based on the drawings by those skilled in the art of the present disclosure without inventive work.

DETAILED DESCRIPTION OF THE PREFERRED EMBODIMENTS

Figure 1:
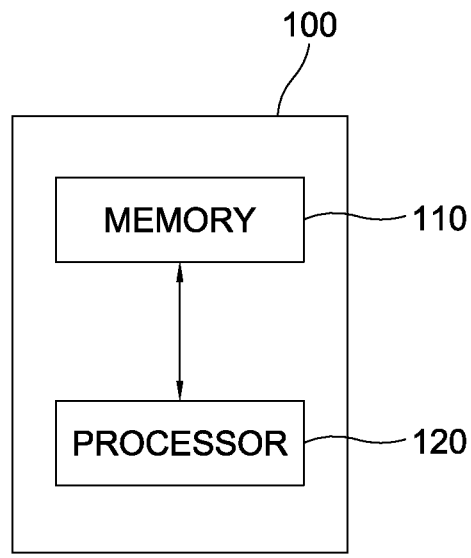
FIG. 1 is a drawing schematically illustrating a learning device used for training a video object detection model using a training dataset in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a drawing schematically illustrating a learning device used for training a video object detection model using a training dataset in accordance with one example embodiment of the present disclosure.

Referring to FIG. 1, the learning device 100 may include a memory 110 to store instructions for training the video object detection model by using the training dataset and a processor 120 for performing processes of training the video object detection model by using the training dataset according to the instructions stored in the memory 110 in accordance with one example embodiment of the present disclosure.

Specifically, the learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

Meanwhile, in response to acquiring a training image from the training dataset, the processor 120 of the learning device 100 may, according to the instructions stored in the memory 110, (i) input the training image and first prior information, set as having each of probabilities of each of objects existing in each of locations in the training image, into the video object detection model, to thereby instruct the video object detection model to detect the objects from the training image by referring to the first prior information and thus output first object detection information, and (ii) generate second prior information, which includes location information of the objects on the training image, by using the first object detection information. Also, the processor 120 may input the training image and the second prior information into the video object detection model, to thereby instruct the video object detection model to detect the objects on the training image by referring to the second prior information and thus output second object detection information. Afterwards, the processor 120 may generate at least one loss by referring to the second object detection information and a ground truth corresponding to the training image, to thereby train the video object detection model to minimize the loss.

Further, in response to acquiring a training video from the training dataset, the processor 120 of the learning device may, according to the instructions stored in the memory 110, perform one of processes of (i) (i-1) inputting (i-1-1) a (t−i)-th frame image, which is any one of frame images prior to a t-th frame image, or a (t+j)-th frame image, which is any one of frame images following the t-th frame image, wherein the t-th frame image is any one of a plurality of frame images constituting the training video, and (i-1-2) the first prior information, set as having each of probabilities of each of objects existing in each of locations in the (t−i)-th frame image or the (t+j)-th frame image, into the video object detection model, to thereby instruct the video object detection model to detect the objects from the (t−i)-th frame image or the (t+j)-th frame image by referring to the first prior information and thus output the first object detection information, and (i-2) generating the second prior information, which includes multiple pieces of location information of the objects on the (t−i)-th frame image or the (t+j)-th frame image, by using the first object detection information, and (ii) generating the second prior information, which includes multiple pieces of the location information of the objects on the (t−i)-th frame image or the (t+j)-th frame image, by using a (t−i)-th ground truth corresponding to the (t-i)-th frame image or a (t+j)-th ground truth corresponding to the (t+j)-th frame image. Also, the processor 120 may input the t-th frame image and the second prior information into the video object detection model, to thereby instruct the video object detection model to detect the objects on the t-th frame image by referring to the second prior information and thus output second object detection information. Afterwards, the processor 120 may generate the loss by referring to the second object detection information and a t-th ground truth corresponding to the t-th frame image, to thereby train the video object detection model to minimize the loss.

A method for training the video object detection model using the training dataset in accordance with one example embodiment of the present disclosure by using the learning device 100 with the above configuration will be explained below.

Figure 2:
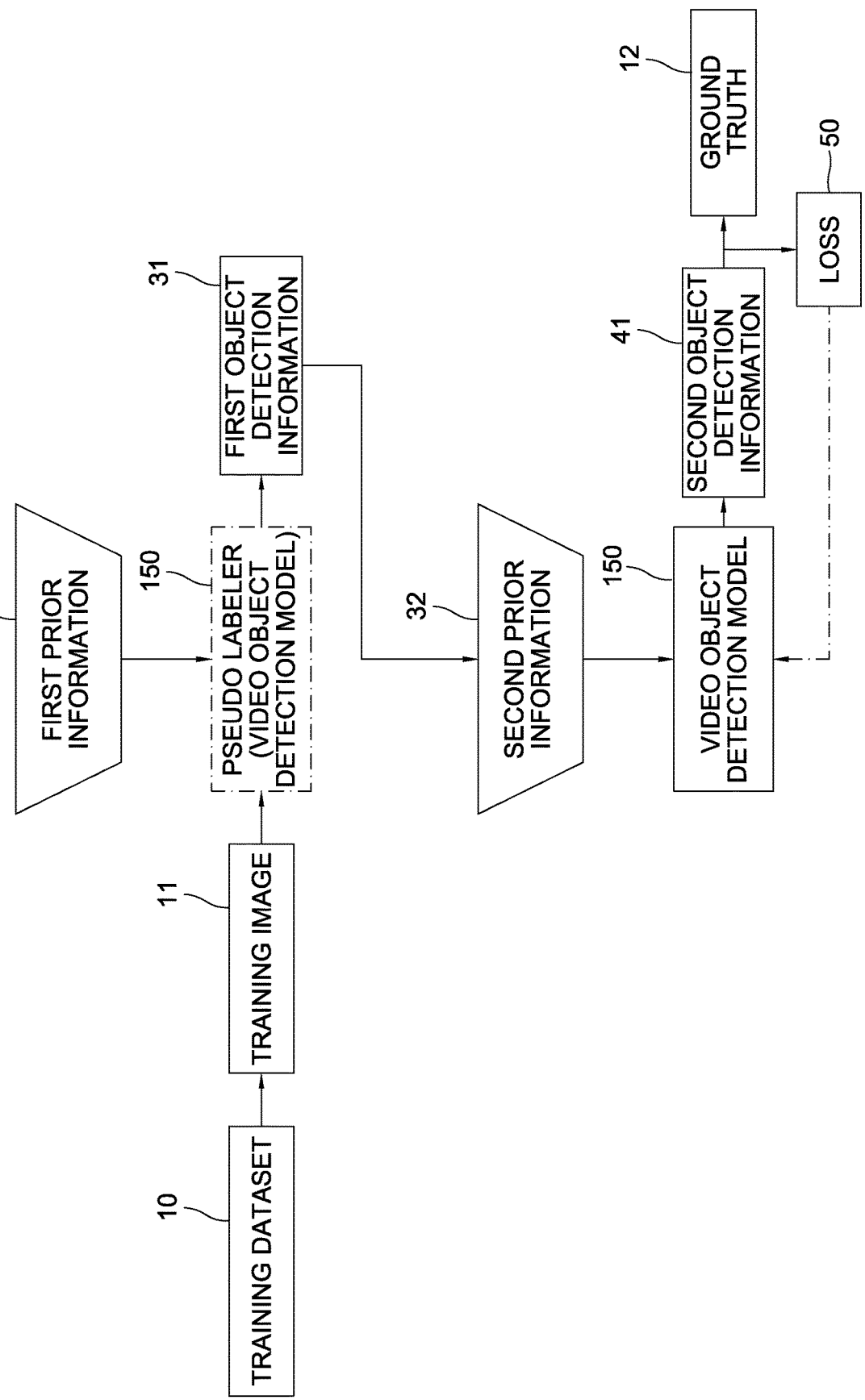
FIG. 2 is a drawing schematically illustrating a method for training the video object detection model using the training dataset in accordance with one example embodiment of the present disclosure.

FIG. 2 is a drawing schematically illustrating the method for training the video object detection model using the training dataset in accordance with one example embodiment of the present disclosure.

First, in response to acquiring the training image 11 from the training dataset 10, the learning device 100 may (i) input the training image and the first prior information 20, set as having each of the probabilities of each of the objects existing in each of the locations in the training image, into the video object detection model 150, to thereby instruct the video object detection model 150 to detect the objects from the training image 11 by referring to the first prior information 20 and thus output the first object detection information 31. Herein, the first object detection information 31 may include information on at least one class and information on at least one bounding box of the objects.

It is appreciated that the first prior information 20 may be additionally set as having each of the probabilities of each of the objects not existing in one or more specific areas of the training image 11. Since processes of detecting the objects from the training image 11 by using the first prior information 20 are similar to processes of detecting the objects from the training image 11 by using the second prior information 32, which will be explained hereinafter, detail explanations thereof will be given by the example of using the second prior information 32 to detect the objects from the training image 11.

Meanwhile, the video object detection model 150, which detects the objects from the training image 11 by using the first prior information 20, may function as a pseudo labeler capable of generating at least one object detection result similar to at least one previous object detection result (which is acquired by using the video data in a testing mode which represents a stage following the completion of the training mode mentioned above) of a previous frame image, therefore the video object detection model 150 itself that is currently being trained may be used as the pseudo labeler to allow the inaccurate video object detection model 150 to adapt to its own detection result.

Next, the learning device 100 may generate the second prior information 32, which includes the location information of the objects on the training image 11, by using the first object detection information 31. Herein, the second prior information 32 may be pseudo temporal information generated by using the object detection result of the training image 11 such that it corresponds to temporal information generated by using the previous object detection result of the previous frame image included in a video data, i.e., the training image, of training dataset 10. Further, the learning device 100 may generate the second prior information 32 by using the first object detection information 31 such as each of corresponding information on locations, sizes, confidences of the objects.

For example, the learning device 100 may generate, as the second prior information 32, (i) a first mask having a same size as the training image 11 or (ii) at least one second mask having a same size as at least one feature map obtained through a forward-propagation of the training image in the video object detection model, by using multiple pieces of location information of each of bounding boxes corresponding to each of the objects included in the first object detection information 31. Herein the first mask and the second mask are obtained by distinguishing each of regions corresponding to each of the bounding boxes from regions corresponding to non-bounding boxes.

As another example, the leaning device 100 may generate, as the second prior information 32, a bounding box vector by vectorizing multiple pieces of the location information of each of the bounding boxes corresponding to each of the objects included in the first object detection information 31.

Next, the learning device 100 may input the training image 11 and the second prior information 32 into the video object detection model 150, to thereby instruct the video object detection model 150 to detect the objects on the training image 11 by referring to the second prior information 32 and thus output second object detection information 41.

Herein, if the second prior information 32 is a mask-based prior information as described previously, the learning device 100 may (i) input the first mask into the video object detection model 150, to thereby instruct the video object detection model 150 to (i-1) apply the first mask to the training image 11 by an addition, a multiplication, or a concatenation thereof, thus generating a modified training image, and (i-2) perform the forward-propagation of the modified training image, thus detecting the objects from the modified training image. Also, the learning device 100 may (ii) input the second mask into the video object detection model, to thereby instruct the video object detection model to (ii-1) apply the second mask to the feature map by an addition, a multiplication, or a concatenation thereof, thus generating at least one modified feature map, and (ii-2) perform a part of the forward-propagation of the modified feature map, thus detecting the objects from the modified feature map.

Further, if the second prior information 32 is a vector-based prior information as described previously, the learning device 100 may (i) input the bounding box vector into the video object detection model 150, to thereby instruct the video object detection model 150 to (i-1) apply predetermined pixel values, corresponding to the bounding box vector, to the training image 11 by an addition, a multiplication, or a concatenation thereof, thus generating the modified training image, and (i-2) perform a part of a forward-propagation of the modified training image. Also, the learning device 100 may (ii) input the bounding box vector into the video object detection model 150, to thereby instruct the video object detection model 150 to (ii-1) apply predetermined feature values, corresponding to the bounding box vector, to at least one feature map by an addition, a multiplication, or a concatenation thereof, thus generating at least one modified feature map, and (ii-2) perform the part of the forward-propagation of the modified feature map.

Herein, the predetermined pixel values and the predetermined feature values correspond to multiple pieces of the location information of the bounding boxes corresponding to the bounding box vector, and wherein the feature map is obtained through the forward-propagation of the training image.

Figure 3:
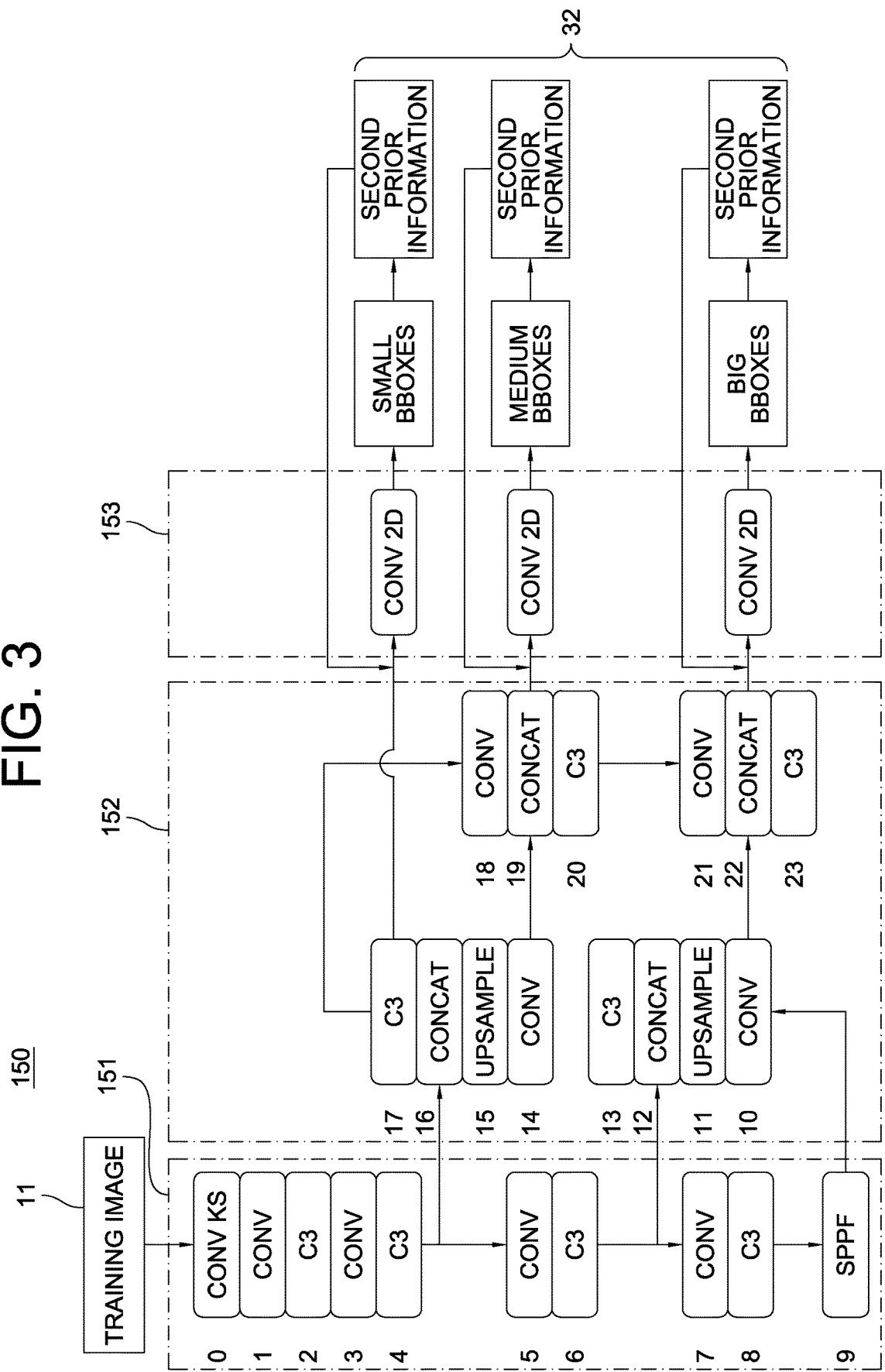
FIG. 3 is a drawing schematically illustrating the video object detection model in the method for training the video object detection model using the training dataset in accordance with one example embodiment of the present disclosure.

For example, by referring to FIG. 3, the video object detection model 150 may be a YOLO (You Only Look Once) model, and when the training image 11 and the second prior information 32 are inputted into the video object detection model 150, the video object detection model 150 may extract the at least one feature map with various sizes from the training image 11 through several layers of convolutional layers and pooling layers in a backbone 151. In addition, the video object detection model 150 may fuse the at least one feature map of various sizes generated in the backbone 151 through a path aggregation network (PAN) of a neck 152. Thereafter, the video object detection model 150 may apply the mask-based or vector-based second prior information 32 to each of the feature map generated in the neck 152, and generate the modified training image or the modified feature map, to be inputted into the head 153, to thereby allow convolutional layers of the head 153 to output the second object detection information 41 with information on bounding box parameters (x, y, w, h), objects existence probabilities, and classes existence probabilities.

Herein, the second prior information 32 is applied to the feature map outputted from the neck 152, however, unlike above it may be applied to the training image 11 itself or applied to the feature map generated within the backbone 151 or the neck 152.

Figure 4:
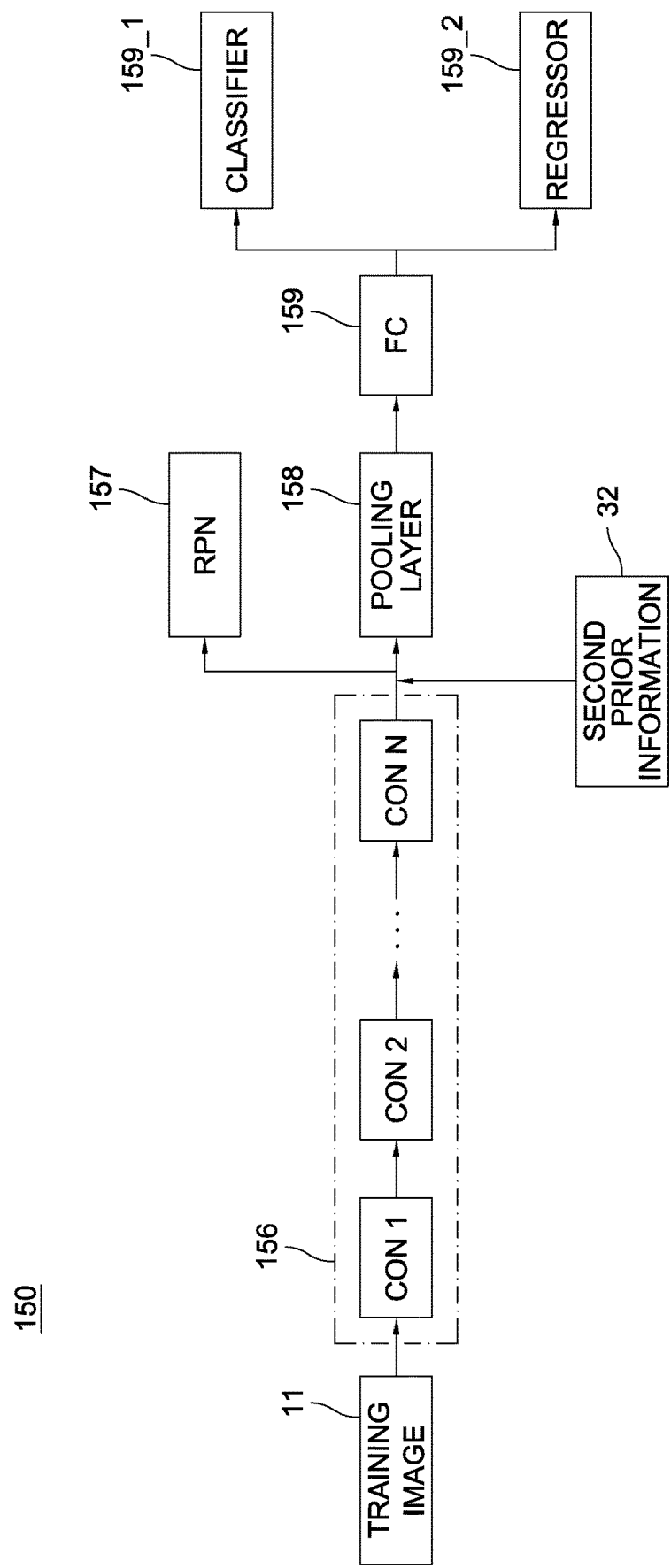
FIG. 4 is a drawing schematically illustrating the video object detection model in the method for training the video object detection model using the training dataset in accordance with another example embodiment of the present disclosure.

As another example, by referring to FIG. 4, the video object detection model 150 may be an R-CNN-based model, and when the training image 11 is inputted, the video object detection model 150 may generate the at least one feature map by applying convolution operations to the training image 11 through a convolution network 156 with a plurality of convolutional layers. In addition, the video object detection model 150 may apply the mask-based or vector-based second prior information 32 to the feature map outputted from the convolution network 156 to generate a modified feature map, and thus generate proposals, which are candidate regions where the objects are located in the modified feature map, through the RPN 157, to thereby generate at least one pooled feature map through the pooling layer 158 by pooling regions corresponding to the proposals from the modified feature map. Thereafter, the video object detection model 150 may (1) perform a fully connected operation on the pooled feature map through a FC layer 159, (2) generate information on classes corresponding to the objects through a classifier 159_1, and (3) generate the second object detection information by generating the location information of the bounding boxes through a regressor 159_2.

Herein, the second prior information 32 is applied to the feature map outputted from the convolutional network 156, to thereby generate the modified training map, however, it may be applied to the training image 11 itself or applied to the feature maps generated within the convolutional network 156, to thereby generate the modified training map.

The example of the video object detection model 150 being a YOLO model or a Faster R-CNN was explained above with reference to FIG. 3 and FIG. 4, however, the video object detection model 150 may also be various other deep learning-based models such as SSD (Single Shot Detector) model, or RetinalNet, etc., and applied accordingly.

By referring to FIG. 2, the learning device 100 may generate the loss 50 by referring to the second object detection information 41 and a ground truth 12 corresponding to the training image 11, to thereby train the video object detection model 150 to minimize the loss.

The learning device 100 may allow the video object detection model 150 itself to function as the pseudo labeler to generate a pseudo-object detection result from the training image 11, and then train the video object detection model 150 by using the pseudo object detection result to train the video object detection model 150, thereby allowing the inaccurate video object detection model 150 to adapt to its own detection result and thus improving an object detection performance of the video data.

Figure 5:
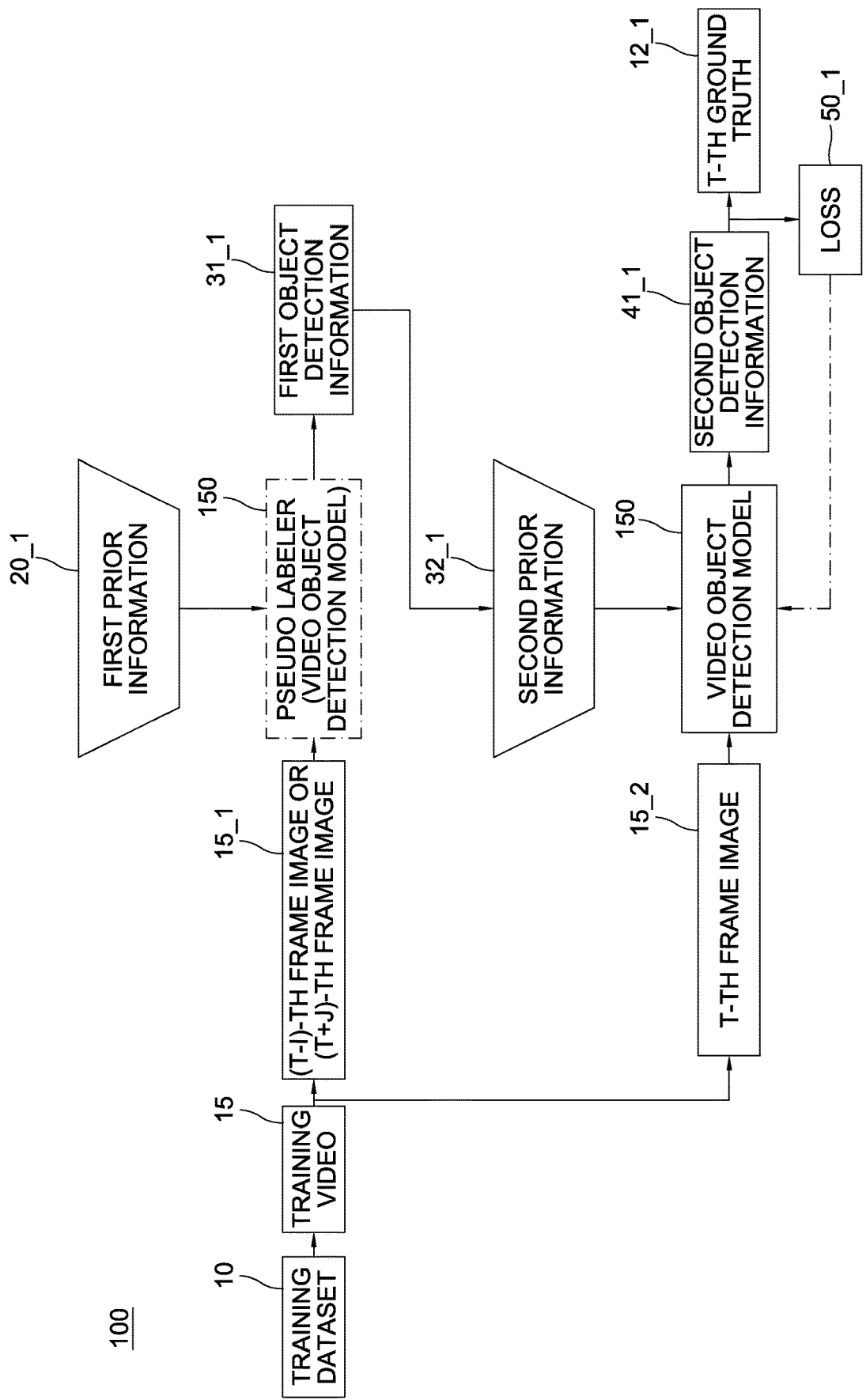
FIG. 5 is a drawing schematically illustrating the method for training the video object detection model using the training dataset in accordance with another example embodiment of the present disclosure.

FIG. 5 is a drawing schematically illustrating the method for training the video object detection model 150 using the training dataset 10 in accordance with another example embodiment of the present disclosure. Below, some explanations that are similar to processes illustrated in FIG. 2 will be omitted.

First, in response to acquiring the training video 15 from the training dataset 10, the learning device 100 may (i) (i-1) input (i-1-1) a (t−i)-th frame image 15_1, which is any one of the frame images prior to a t-th frame image 15_2, or a (t+j)-th frame image 15_1, which is any one of the frame images following the t-th frame image 15_2, wherein the t-th frame image is any one of a plurality of frame images constituting the training video 15, and (i-1-2) the first prior information 20_1, set as having each of probabilities of each of objects existing in each of locations in the (t−i)-th frame image or the (t+j)-th frame image, into the video object detection model 150, to thereby instruct the video object detection model 150 to detect the objects from the (t−i)-th frame image 15_1 or the (t+j)-th frame image 15_1 by referring to the first prior information 20_1 and thus output the first object detection information 31_1. The first object detection information 31_1 may include the information on classes of the objects and the information of each of the bounding boxes. Herein, i and j are integers greater than 0 and they may be same or different.

Herein, the first prior information 20_1 may be additionally set as having each of probabilities of each of the objects not existing in the one or more specific areas of the (t−i)-th frame image 15_1, or the (t+j)-th frame image 15_1. Also, since processes of the video object detection network 150 performing object detection on the (t−i)-th frame image 15_1 or the (t+j)-th frame image 15_1 using the first prior information 20_1 are similar to processes of performing object detection on the t-th frame image 15_2 using the second prior information 32_1, which will be described later, a detailed description thereof will given by detailing the processes of performing the object detection on the t-th frame 15_2 using the second prior information 32_1.

Meanwhile, the video object detection model 150, which may detect the objects from the (t−i)-th frame image 15_1 or the (t+j)-th frame image 15_1 by using the first prior information 20_1, may function as the pseudo labeler to generate the at least one object detection result similar to the at least one previous object detection result (which is acquired by using the video data in a testing mode which represents a stage following the completion of the training mode mentioned above) of the previous frame image, therefore the video object detection model 150 itself that is currently being trained may be used as the pseudo labeler to allow the inaccurate video object detection model 150 to adapt to its own detection result.

Next, the learning device 100 may generate the second prior information 32_1, which includes multiple pieces of location information of the objects on the (t−i)-th frame image 15_1 or the (t+j)-th frame image 15_1, by using the first object detection information 31_1. Herein, the second prior information 32_1 may be the pseudo temporal information generated by using an object detection result of the (t−i)-th frame image 15_1 or the (t+j)-th frame image 15_1 such that it corresponds to the temporal information generated by using the previous object detection result of the previous frame image in the video data. In addition, the learning device 100 may generate the second prior information 32_1 by using the first object detection information 31_1 such as each of the corresponding information on the locations, the sizes, the confidences of the objects.

For example, the learning device 100 may generate, as the second prior information 32_1, (i) (i-1) the first mask having a same size as the (t−i)-th frame image 15_1 or the (t+j)-th frame image 15_1, that is a same size as the training video 15, or (i-2) the at least one second mask having a same size as at least one first feature map obtained through the forward-propagation of the (t−i)-th frame image 15_1 or the (t+j)-th frame image 15_1 in the video object detection model 150, by using multiple pieces of the location information of the bounding boxes corresponding to each of the objects included in the first object detection information 31_1. Herein the first mask and the second mask are obtained by distinguishing the each of regions corresponding to each of the bounding boxes from the regions corresponding to the non-bounding boxes.

As another example, the learning device 100 may generate, as the second prior information 32_1, the bounding box vector by vectorizing multiple pieces of the location information of the bounding boxes corresponding to each of the objects included in the first object detection information 31_1.

Next, the learning device 100 may input the t-th frame image 15_2 and the second prior information 32_1 into the video object detection model 150, to thereby instruct the video object detection model 150 to detect the objects on the t-th frame image 15_2 by referring to the second prior information 32_1 and thus output second object detection information 41_1.

Herein, if the second prior information 32_1 is the mask-based prior information, the learning device 100 may input the first mask into the video object detection model 150, to thereby instruct the video object detection model 150 to (i-1) apply the first mask to the t-th frame image 15_2 by an addition, a multiplication, or a concatenation thereof, thus generating the modified frame image, and (i-2) perform the forward-propagation of the modified frame image, thus detecting the objects from the modified frame image. Also, the learning device 100 may input the second mask into the video object detection model 150, to thereby instruct the video object detection model 150 to (ii-1) apply the second mask to the at least one second feature map by an addition, a multiplication, or a concatenation thereof, thus generating at least one modified feature map, and (ii-2) perform the part of the forward-propagation of the modified feature map, thus detecting the objects from the modified feature map.

Further, if the second prior information 32_1 is the vector-based prior information, the learning device 100 may input the bounding box vector into the video object detection model 150, to thereby instruct the video object detection model 150 to (i-1) apply the predetermined pixel values, corresponding to the bounding box vector, to the t-th frame image 15_2 by an addition, a multiplication, or a concatenation thereof, thus generating the modified frame image, and (i-2) perform part of the forward-propagation of the modified frame image. Also, the learning device 100 may input the bounding box vector into the video object detection model 150, to thereby instruct the video object detection model 150 to (ii-1) apply the predetermined feature values, corresponding to the bounding box vector, to the at least one second feature map, by an addition, a multiplication, or a concatenation thereof, thus generating the at least one modified feature map, and (ii-2) perform the part of the forward-propagation of the modified feature map.

Herein, the predetermined pixel values and the predetermined feature values correspond to multiple pieces of the location information of the bounding boxes corresponding to the bounding box vector, and wherein the second feature map is obtained through the forward-propagation of the t-th frame image 15_2.

Next, the learning device 100 may generate the at least one loss 50_1 by referring to the second object detection information 41_1 and a t-th ground truth 12_1 corresponding to the t-th frame image 15_2, to thereby train the video object detection model 150 to minimize the loss 50_1.

From above, the learning device 100 may allow the video object detection model 150 itself to function as the pseudo labeler to generate the pseudo object detection result from the (t−i)-th frame image 15_1 or the (t+j)-th frame image 15_1, and then train the video object detection model 150 by using the pseudo object detection result, thereby allowing the inaccurate video object detection model 150 to adapt to its own detection result and thus improving the object detection performance of the video data.

Figure 6:
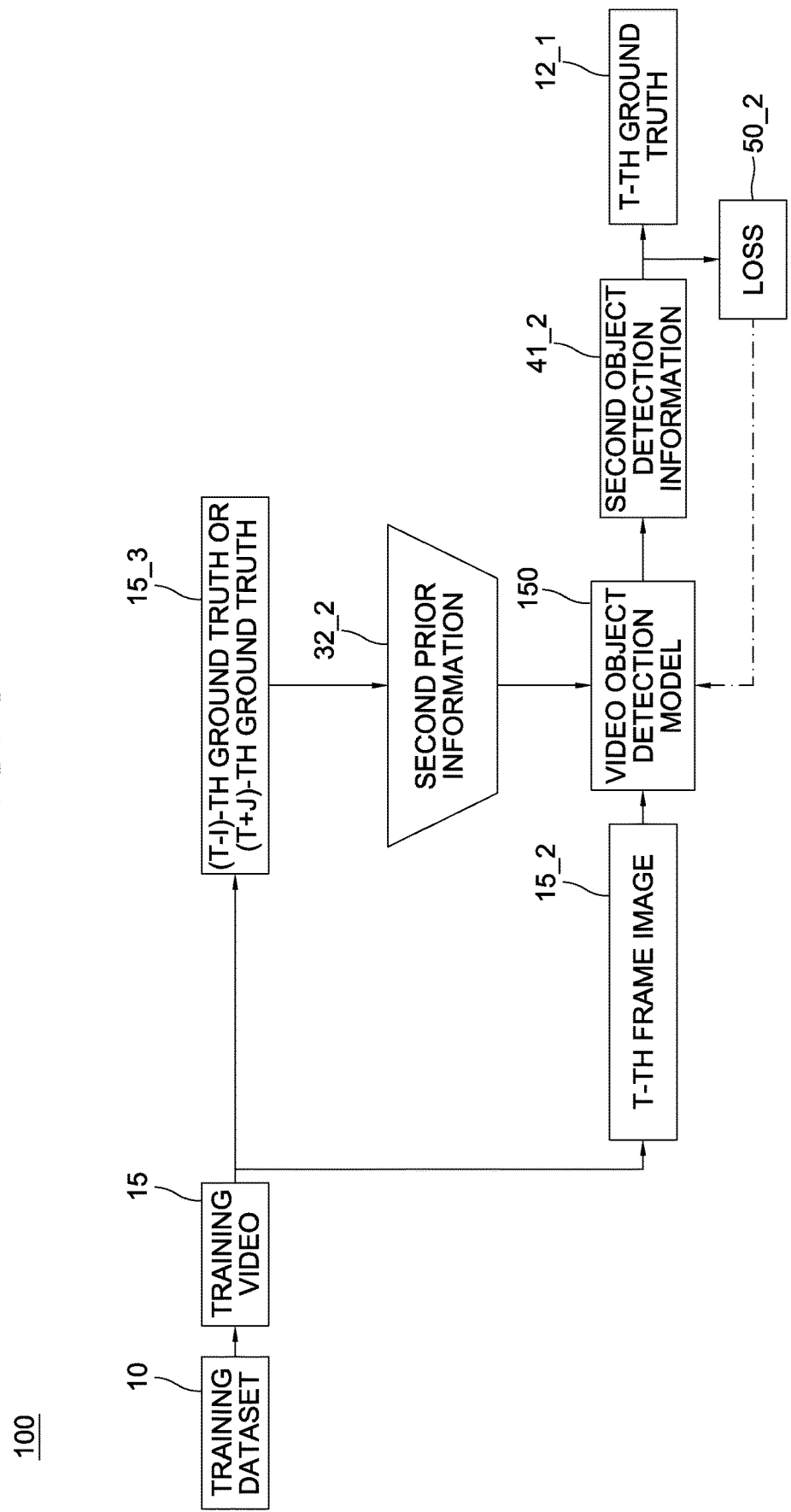
FIG. 6 is a drawing schematically illustrating the method for training the video object detection model using the training dataset in accordance with still another example embodiment of the present disclosure.

FIG. 6 is a drawing schematically illustrating the method for training the video object detection model 150 using the training dataset 10 in accordance with still another example embodiment of the present disclosure. Detail explanations of processes that may be similar to FIG. 2 will be omitted.

First, in response to acquiring the training video 15 from the training dataset 10, the learning device 100 may generate the second prior information 32_2, which includes multiple pieces of the location information of the objects on the (t−i)-th frame image or the (t+j)-th frame image, by using the (t−i)-th ground truth 15_3 corresponding to the (t−i)-th frame image or the (t+j)-th ground truth 15_3 corresponding to the (t+j)-th frame image. Herein, the second prior information 32_2 may be the pseudo temporal information generated by using the (t−i)-th ground truth 15_3 corresponding to the (t−i)-th frame image or a (t+j)-th ground truth 15_3 corresponding to the (t+j)-th frame image such that it corresponds to the temporal information generated by using the previous object detection result of the previous frame in the video data.

For example, the learning device 100 may generate, as the second prior information 32_2, (ii-1) the first mask having a same size as the t-th frame image 15_2 or (ii-2) the second mask having a same size as the at least one second feature map obtained through the forward-propagation of the t-th frame image 15_2 in the video object detection model, by using multiple pieces of the location information of the bounding boxes corresponding to each of the objects included in the (t−i)-th ground truth 15_3 or the (t+j)-th ground truth 15_3. Herein, the first mask and the second mask are obtained by distinguishing each of the regions corresponding to each of the bounding boxes from the regions corresponding to the non-bounding boxes.

As another example, the learning device 100 may generate, as the second prior information 32_2, the bounding box vector by vectorizing the location information of the bounding boxes corresponding to each of the objects included in the (t−i)-th ground truth 15_3 or the (t+j)-th ground truth 15_3.

Next, the learning device may input the t-th frame image 15_2 and the second prior information 32_2 into the video object detection model 150, to thereby instruct the video object detection model 150 to detect the objects on the t-th frame image 15_2 by referring to the second prior information 32_2 and thus output the second object detection information 41_2.

Herein, if the second prior information 32_2 is the mask-based prior information, the learning device 100 may input the first mask into the video object detection model 150, to thereby instruct the video object detection model 150 to (i-1) apply the first mask to the t-th frame image 15_2 by an addition, a multiplication, or a concatenation thereof, thus generating the modified frame image, and (i-2) perform the forward-propagation of the modified frame image, thus detecting the objects from the modified frame image. Also, the learning device 100 may input the second mask into the video object detection model 150, to thereby instruct the video object detection model 150 to (ii-1) apply the second mask to the at least one second feature map by an addition, a multiplication, or a concatenation thereof, thus generating the at least one modified feature map, and (ii-2) perform the part of the forward-propagation of the modified feature map, thus detecting the objects from the modified feature map.

Further, if the second prior information 32_2 is the vector-based information, the learning device 100 may input the bounding box vector into the video object detection model 150, to thereby instruct the video object detection model 150 to (i-1) apply the predetermined pixel values, corresponding to the bounding box vector, to the t-th frame image 15_2 by an addition, a multiplication, or a concatenation thereof, thus generating the modified frame image, and (i-2) perform part of the forward-propagation of the modified frame image. Also, the learning device 100 may input the bounding box vector into the video object detection model 150, to thereby instruct the video object detection model 150 to (ii-1) apply the predetermined feature values, corresponding to the bounding box vector, to the at least one second feature map, by an addition, a multiplication, or a concatenation thereof, thus generating the at least one modified feature map, and (ii-2) perform the part of the forward-propagation of the modified feature map.

Herein, the predetermined pixel values and the predetermined feature values correspond to multiple pieces of the location information of the bounding boxes corresponding to the bounding box vector, and wherein the second feature map is obtained through the forward-propagation of the t-th frame image 15_2.

Next, the learning device may generate at least one loss 50_2 by referring to the second object detection information 41_2 and a t-th ground truth 12_1 corresponding to the t-th frame image 15_2, to thereby train the video object detection model 150 to minimize the loss 50_2.

From above, the learning device 100 may generate the pseudo object detection result from the (t−i)-th ground truth 15_3 corresponding to the (t−i)-th frame image or the (t+j)-th ground truth 15_3 corresponding to the (t+j)-th frame image, and train the video object detection network 150 by using the pseudo object detection result, to thereby allow the inaccurate video object detection model 150 to adapt to its own detection result and thus improving the object detection performance of the video data.

Figure 7:
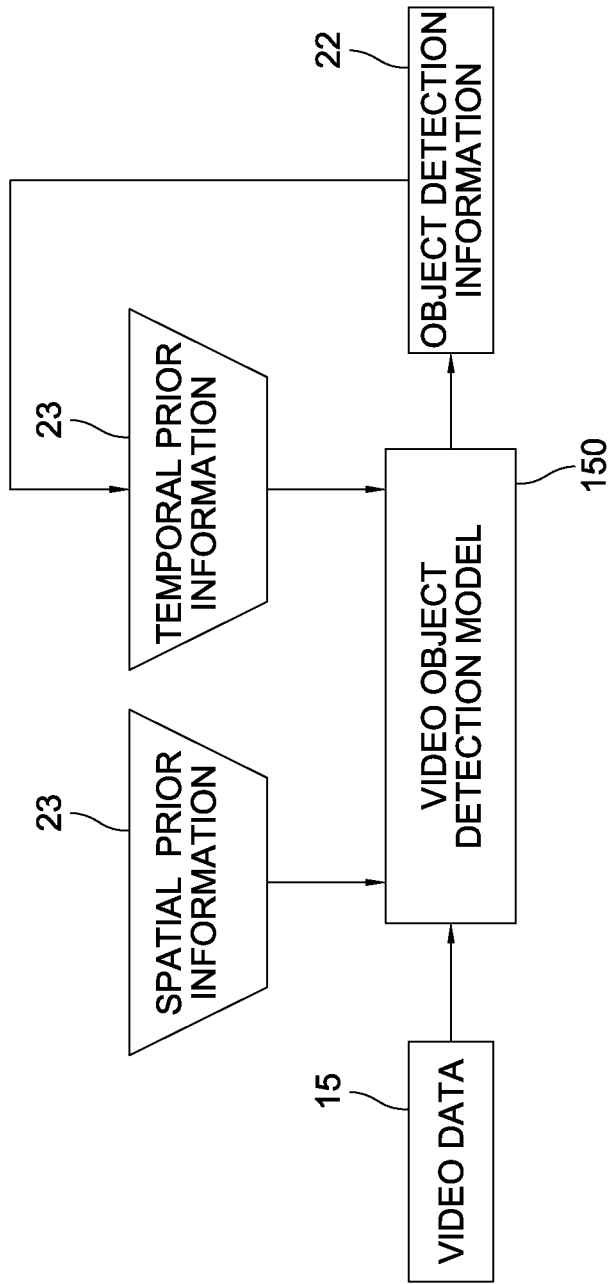
FIG. 7 is a drawing schematically illustrating a method for inferencing the video object detection model trained using the training dataset in accordance with one example embodiment of the present disclosure.

FIG. 7 is a drawing schematically illustrating an inference state in which object detection is performed on the video data inputted in real-time using the video object detection model 150 trained using the training dataset in accordance with one example embodiment of the present disclosure.

On condition that the video object detection model 150 has been trained to perform object detection by using prior information inputted through methods illustrated in FIG. 2 to FIG. 6, in response to inputting the video data 15, having successive frame images photographed by a camera, into the computing device 200, the computing device 200 may input a current frame image and the prior information 23, generated by using object detection information 22 acquired from the previous frame image, into the video object detection model 150.

Herein, the prior information 23 may be the temporal information related to the location information of the bounding boxes according to object detection information detected from the previous frame image, and may further include spatial information, which indicates that the objects cannot be located in the specific area in a frame image of the video data.

In addition, the prior information 23 may be generated by using an object detection result from the frame image immediately preceding the current frame image, or an average of two immediately preceding frame images, but the present invention is not limited thereto, and may generate the prior information 23 by using a combination of previous frame images.

Moreover, the video object detection model 150 may detect the objects from the current frame image using the prior information 23 and generate the object detection result for the current frame image.

The present disclosure has an effect of training the video object detection model using the training dataset that is relatively easy to collect various backgrounds.

The present disclosure has another effect of training the video object detection model using the training dataset, in which a lot of data having various backgrounds are collected at a low cost.

The present disclosure has still another effect of training of the video object detection model using training data from the training dataset, which includes both image data and video data.

The present disclosure has still yet another effect of training of the video object detection model by generating pseudo temporal information from the training data by using the video object detection model itself as a pseudo labeler and thus train the video object detection.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high-level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method of training a video object detection model by using a training dataset, comprising steps of:
  (a) in response to acquiring a training image from the training dataset, a learning device (i) inputting the training image and first prior information, set as having each of probabilities of each of objects existing in each of locations in the training image, into the video object detection model, to thereby instruct the video object detection model to detect the objects from the training image by referring to the first prior information and thus output first object detection information, and (ii) generating second prior information, which includes location information of the objects on the training image, by using the first object detection information;
  (b) the learning device inputting the training image and the second prior information into the video object detection model, to thereby instruct the video object detection model to detect the objects on the training image by referring to the second prior information and thus output second object detection information; and
  (c) the learning device generating at least one loss by referring to the second object detection information and a ground truth corresponding to the training image, to thereby train the video object detection model to minimize the loss,
  wherein, at the step of (a), the learning device generates, as the second prior information, (i) a first mask having a same size as the training image or (ii) at least one second mask having a same size as at least one feature map obtained through a forward-propagation of the training image in the video object detection model, by using multiple pieces of location information of each of bounding boxes corresponding to each of the objects included in the first object detection information, wherein the first mask and the second mask are obtained by distinguishing each of regions corresponding to each of the bounding boxes from regions corresponding to non-bounding boxes.

2. The method of claim 1, wherein, at the step of (b), the learning device performs at least one of processes of (i) inputting the first mask into the video object detection model, to thereby instruct the video object detection model to (i-1) apply the first mask to the training image by an addition, a multiplication, or a concatenation thereof, thus generating a modified training image, and (i-2) perform the forward-propagation of the modified training image, thus detecting the objects from the modified training image, and (ii) inputting the second mask into the video object detection model, to thereby instruct the video object detection model to (ii-1) apply the second mask to the feature map by an addition, a multiplication, or a concatenation thereof, thus generating at least one modified feature map, and (ii-2) perform a part of the forward-propagation of the modified feature map, thus detecting the objects from the modified feature map.

3. The method of claim 1, wherein the first prior information is additionally set as having each of the probabilities of each of the objects not existing in one or more specific areas of the training image.

4. A method of training a video object detection model using a training dataset, comprising steps of:
(a) in response to acquiring a training video from the training dataset, a learning device performs one of processes of (i) (i-1) inputting (i-1-1) a (t−i)-th frame image, which is any one of frame images prior to a t-th frame image, or a (t+j)-th frame image, which is any one of frame images following the t-th frame image, wherein the t-th frame image is any one of a plurality of frame images constituting the training video, and wherein i and j are integers greater than 0, and (i-1-2) first prior information, set as having each of probabilities of each of objects existing in each of locations in the (t−i)-th frame image or the (t+j)-th frame image, into the video object detection model, to thereby instruct the video object detection model to detect the objects from the (t−i)-th frame image or the (t+j)-th frame image by referring to the first prior information and thus output first object detection information, and (i-2) generating second prior information, which includes multiple pieces of location information of the objects on the (t−i)-th frame image or the (t+j)-th frame image, by using the first object detection information, and (ii) generating the second prior information, which includes multiple pieces of the location information of the objects on the (t−i)-th frame image or the (t+j)-th frame image, by using a (t−i)-th ground truth corresponding to the (t−i)-th frame image or a (t+j)-th ground truth corresponding to the (t+j)-th frame image;
(b) the learning device inputting the t-th frame image and the second prior information into the video object detection model, to thereby instruct the video object detection model to detect the objects on the t-th frame image by referring to the second prior information and thus output second object detection information; and
(c) the learning device generating at least one loss by referring to the second object detection information and a t-th ground truth corresponding to the t-th frame image, to thereby train the video object detection model to minimize the loss.

5. The method of claim 4, wherein, at the step of (a), the learning device generates, as the second prior information, (i) (i-1) a first mask having a same size as the (t−i)-th frame image or the (t+j)-th frame image or (i-2) at least one second mask having a same size as at least one first feature map obtained through a forward-propagation of the (t−i)-th frame image or the (t+j)-th frame image in the video object detection model, by using multiple pieces of location information of bounding boxes corresponding to each of the objects included in the first object detection information, or (ii) (ii-1) the first mask having a same size as the t-th frame image or (ii-2) the second mask having a same size as at least one second feature map obtained through the forward-propagation of the t-th frame image in the video object detection model, by using multiple pieces of the location information of the bounding boxes corresponding to each of the objects included in the (t−i)-th ground truth or the (t+j)-th ground truth, wherein the first mask and the second mask are obtained by distinguishing each of regions corresponding to each of the bounding boxes from regions corresponding to non-bounding boxes.

6. The method of claim 5, wherein, at the step of (b), the learning device performs at least one of processes of (i) inputting the first mask into the video object detection model, to thereby instruct the video object detection model to (i-1) apply the first mask to the t-th frame image by an addition, a multiplication, or a concatenation thereof, thus generating a modified frame image, and (i-2) perform the forward-propagation of the modified frame image, thus detecting the objects from the modified frame image, and (ii) inputting the second mask into the video object detection model, to thereby instruct the video object detection model to (ii-1) apply the second mask to the second feature map by an addition, a multiplication, or a concatenation thereof, thus generating at least one modified feature map, and (ii-2) perform a part of the forward-propagation of the modified feature map, thus detecting the objects from the modified feature map.

7. The method of claim 4, wherein, at the step of (a), the learning device generates, as the second prior information, a bounding box vector by vectorizing (1) multiple pieces of location information of bounding boxes corresponding to each of the objects included in the first object detection information, or (2) the location information of the bounding boxes corresponding to each of the objects included in the (t−i)-th ground truth or the (t+j)-th ground truth.

8. The method of claim 7, wherein, at the step of (b), the learning device performs at least one of processes of (i) inputting the bounding box vector into the video object detection model, to thereby instruct the video object detection model to (i-1) apply predetermined pixel values, corresponding to the bounding box vector, to the t-th frame image by an addition, a multiplication, or a concatenation thereof, thus generating a modified frame image, and (i-2) perform part of a forward-propagation of the modified frame image, and (ii) inputting the bounding box vector into the video object detection model, to thereby instruct the video object detection model to (ii-1) apply predetermined feature values, corresponding to the bounding box vector, to at least one second feature map by an addition, a multiplication, or a concatenation thereof, thus generating at least one modified feature map, and (ii-2) perform the part of the forward-propagation of the modified feature map,
wherein the predetermined pixel values and the predetermined feature values correspond to multiple pieces of the location information of the bounding boxes corresponding to the bounding box vector, and wherein the second feature map is obtained through the forward-propagation of the t-th frame image.

9. The method of claim 4, wherein the first prior information is additionally set as having each of the probabilities of each of the objects not existing in one or more specific areas of the (t−i)-th frame image, and the (t+j)-th frame image.

10. A learning device for training a video object detection model by using a training dataset, comprising:
at least one memory that stores instructions; and
at least one processor configured to execute the instructions to perform processes of: (I) in response to acquiring a training image from the training dataset, (i) inputting the training image and first prior information, set as having each of probabilities of each of objects existing in each of locations in the training image, into the video object detection model, to thereby instruct the video object detection model to detect the objects from the training image by referring to the first prior information and thus output first object detection information, and (ii) generating second prior information, which includes location information of the objects on the training image, by using the first object detection information; (II) inputting the training image and the second prior information into the video object detection model, to thereby instruct the video object detection model to detect the objects on the training image by referring to the second prior information and thus output second object detection information; and, (III) generating at least one loss by referring to the second object detection information and a ground truth corresponding to the training image, to thereby train the video object detection model to minimize the loss;
wherein, at the process of (I), the processor generates, as the second prior information, (i) a first mask having a same size as the training image or (ii) at least one second mask having a same size as at least one feature map obtained through a forward-propagation of the training image in the video object detection model, by using multiple pieces of location information of each of bounding boxes corresponding to each of the objects included in the first object detection information, wherein the first mask and the second mask are obtained by distinguishing each of regions corresponding to each of the bounding boxes from regions corresponding to non-bounding boxes.

11. The learning device of claim 10, wherein, at the process of (II), the processor performs at least one of processes of (i) inputting the first mask into the video object detection model, to thereby instruct the video object detection model to (i-1) apply the first mask to the training image by an addition, a multiplication, or a concatenation thereof, thus generating a modified training image, and (i-2) perform the forward-propagation of the modified training image, thus detecting the objects from the modified training image, and (ii) inputting the second mask into the video object detection model, to thereby instruct the video object detection model to (ii-1) apply the second mask to the feature map by an addition, a multiplication, or a concatenation thereof, thus generating at least one modified feature map, and (ii-2) perform a part of the forward-propagation of the modified feature map, thus detecting the objects from the modified feature map.

12. The learning device of claim 10, wherein the first prior information is additionally set as having each of the probabilities of each of the objects not existing in one or more specific areas of the training image.

13. A learning device for training a video object detection model using a training dataset, comprising:
at least one memory that stores instructions; and
at least one processor configured to execute the instructions to perform processes of: (I) in response to acquiring a training video from the training dataset, (i) (i-1) inputting (i-1-1) a (t−i)-th frame image, which is any one of frame images prior to a t-th frame image, or a (t+j)-th frame image, which is any one of frame images following the t-th frame image, wherein the t-th frame image is any one of a plurality of frame images constituting the training video, and wherein i and j are integers greater than 0, and (i-1-2) first prior information, set as having each of probabilities of each of objects existing in each of locations in the (t−i)-th frame image or the (t+j)-th frame image, into the video object detection model, to thereby instruct the video object detection model to detect the objects from the (t−i)-th frame image or the (t+j)-th frame image by referring to the first prior information and thus output first object detection information, and (i-2) generating second prior information, which includes multiple pieces of location information of the objects on the (t−i)-th frame image or the (t+j)-th frame image, by using the first object detection information, and (ii) generating the second prior information, which includes multiple pieces of the location information of the objects on the (t−i)-th frame image or the (t+j)-th frame image, by using a (t−i)-th ground truth corresponding to the (t−i)-th frame image or a (t+j)-th ground truth corresponding to the (t+j)-th frame image; (II) inputting the t-th frame image and the second prior information into the video object detection model, to thereby instruct the video object detection model to detect the objects on the t-th frame image by referring to the second prior information and thus output second object detection information; and, (III) generating at least one loss by referring to the second object detection information and a t-th ground truth corresponding to the t-th frame image, to thereby train the video object detection model to minimize the loss.

14. The learning device of claim 13, wherein, at the process of (I), the processor generates, as the second prior information, (i) (i-1) a first mask having a same size as the (t−i)-th frame image or the (t+j)-th frame image or (i-2) at least one second mask having a same size as at least one first feature map obtained through a forward-propagation of the (t−i)-th frame image or the (t+j)-th frame image in the video object detection model, by using multiple pieces of location information of bounding boxes corresponding to each of the objects included in the first object detection information, or (ii) (ii-1) the first mask having a same size as the t-th frame image or (ii-2) the second mask having a same size as at least one second feature map obtained through the forward-propagation of the t-th frame image in the video object detection model, by using multiple pieces of the location information of the bounding boxes corresponding to each of the objects included in the (t−i)-th ground truth or the (t+j)-th ground truth, wherein the first mask and the second mask are obtained by distinguishing each of regions corresponding to each of the bounding boxes from regions corresponding to non-bounding boxes.

15. The learning device of claim 14, wherein, at the process of (II), the processor performs at least one of processes of (i) inputting the first mask into the video object detection model, to thereby instruct the video object detection model to (i-1) apply the first mask to the t-th frame image by an addition, a multiplication, or a concatenation thereof, thus generating a modified frame image, and (i-2) perform the forward-propagation of the modified frame image, thus detecting the objects from the modified frame image, and (ii) inputting the second mask into the video object detection model, to thereby instruct the video object detection model to (ii-1) apply the second mask to the second feature map by an addition, a multiplication, or a concatenation thereof, thus generating at least one modified feature map, and (ii-2) perform a part of the forward-propagation of the modified feature map, thus detecting the objects from the modified feature map.

16. The learning device of claim 13, wherein, at the process of (I), the processor generates, as the second prior information, a bounding box vector by vectorizing (1) multiple pieces of location information of bounding boxes corresponding to each of the objects included in the first object detection information, or (2) the location information of the bounding boxes corresponding to each of the objects included in the (t−i)-th ground truth or the (t+j)-th ground truth.

17. The learning device of claim 16, wherein, at the process of (II), the processor performs at least one of processes of (i) inputting the bounding box vector into the video object detection model, to thereby instruct the video object detection model to (i-1) apply predetermined pixel values, corresponding to the bounding box vector, to the t-th frame image by an addition, a multiplication, or a concatenation thereof, thus generating a modified frame image, and (i-2) perform part of a forward-propagation of the modified frame image, and (ii) inputting the bounding box vector into the video object detection model, to thereby instruct the video object detection model to (ii-1) apply predetermined feature values, corresponding to the bounding box vector, to at least one second feature map by an addition, a multiplication, or a concatenation thereof, thus generating at least one modified feature map, and (ii-2) perform the part of the forward-propagation of the modified feature map,
wherein the predetermined pixel values and the predetermined feature values correspond to multiple pieces of the location information of the bounding boxes corresponding to the bounding box vector, and wherein the second feature map is obtained through the forward-propagation of the t-th frame image.

18. The learning device of claim 13, wherein the first prior information is additionally set as having each of the probabilities of each of the objects not existing in one or more specific areas of the (t−i)-th frame image, and the (t+j)-th frame image.

19. A method of training a video object detection model by using a training dataset, comprising steps of:
(a) in response to acquiring a training image from the training dataset, a learning device (i) inputting the training image and first prior information, set as having each of probabilities of each of objects existing in each of locations in the training image, into the video object detection model, to thereby instruct the video object detection model to detect the objects from the training image by referring to the first prior information and thus output first object detection information, and (ii) generating second prior information, which includes location information of the objects on the training image, by using the first object detection information;
(b) the learning device inputting the training image and the second prior information into the video object detection model, to thereby instruct the video object detection model to detect the objects on the training image by referring to the second prior information and thus output second object detection information;
(c) the learning device generating at least one loss by referring to the second object detection information and a ground truth corresponding to the training image, to thereby train the video object detection model to minimize the loss;
wherein, at the step of (a), the learning device generates, as the second prior information, a bounding box vector by vectorizing multiple pieces of location information of each of bounding boxes corresponding to each of the objects included in the first object detection information; and
wherein, at the step of (b), the learning device performs at least one of processes of (i) inputting the bounding box vector into the video object detection model, to thereby instruct the video object detection model to (i-1) apply predetermined pixel values, corresponding to the bounding box vector, to the training image by an addition, a multiplication, or a concatenation thereof, thus generating a modified training image, and (i-2) perform a part of a forward-propagation of the modified training image, and (ii) inputting the bounding box vector into the video object detection model, to thereby instruct the video object detection model to (ii-1) apply predetermined feature values, corresponding to the bounding box vector, to at least one feature map by an addition, a multiplication, or a concatenation thereof, thus generating at least one modified feature map, and (ii-2) perform the part of the forward-propagation of the modified feature map,
wherein the predetermined pixel values and the predetermined feature values correspond to multiple pieces of the location information of the bounding boxes corresponding to the bounding box vector, and wherein the feature map is obtained through the forward-propagation of the training image.

20. A learning device for training a video object detection model by using a training dataset, comprising:
at least one memory that stores instructions; and
at least one processor configured to execute the instructions to perform processes of: (I) in response to acquiring a training image from the training dataset, (i) inputting the training image and first prior information, set as having each of probabilities of each of objects existing in each of locations in the training image, into the video object detection model, to thereby instruct the video object detection model to detect the objects from the training image by referring to the first prior information and thus output first object detection information, and (ii) generating second prior information, which includes location information of the objects on the training image, by using the first object detection information; (II) inputting the training image and the second prior information into the video object detection model, to thereby instruct the video object detection model to detect the objects on the training image by referring to the second prior information and thus output second object detection information; and, (III) generating at least one loss by referring to the second object detection information and a ground truth corresponding to the training image, to thereby train the video object detection model to minimize the loss;
wherein, at the process of (I), the processor generates, as the second prior information, a bounding box vector by vectorizing multiple pieces of location information of each of bounding boxes corresponding to each of the objects included in the first object detection information; and wherein, at the process of (II), the processor performs at least one of processes of (i) inputting the bounding box vector into the video object detection model, to thereby instruct the video object detection model to (i-1) apply predetermined pixel values, corresponding to the bounding box vector, to the training image by an addition, a multiplication, or a concatenation thereof, thus generating a modified training image, and (i-2) perform a part of a forward-propagation of the modified training image, and (ii) inputting the bounding box vector into the video object detection model, to thereby instruct the video object detection model to (ii-1) apply predetermined feature values, corresponding to the bounding box vector, to at least one feature map by an addition, a multiplication, or a concatenation thereof, thus generating at least one modified feature map, and (ii-2) perform the part of the forward-propagation of the modified feature map, wherein the predetermined pixel values and the predetermined feature values correspond to multiple pieces of the location information of the bounding boxes corresponding to the bounding box vector, and wherein the feature map is obtained through the forward-propagation of the training image.

\* \* \* \* \*